United States Patent
Yang

Patent Number: 5,783,946
Date of Patent: Jul. 21, 1998

[54] FAULT TYPE CLASSIFICATION ALGORITHM

[75] Inventor: Lifeng Yang, Coral Springs, Fla.

[73] Assignee: ABB Power T&D Company Inc., Raleigh, N.C.

[21] Appl. No.: 811,871

[22] Filed: Mar. 5, 1997

[51] Int. Cl.$^6$ .................................................. G01R 31/08
[52] U.S. Cl. .......................... 324/522; 324/509; 364/481; 364/483; 361/80
[58] Field of Search ................................ 324/521, 522, 324/509; 364/481, 483, 492; 361/80

[56] References Cited

U.S. PATENT DOCUMENTS

| | | | |
|---|---|---|---|
| 3,800,215 | 3/1974 | Souillord | 324/522 |
| 4,559,491 | 12/1985 | Saha | 324/522 |
| 4,795,983 | 1/1989 | Crockett et al. | 324/521 |
| 4,797,805 | 1/1989 | Nimmersjo | 364/481 |
| 4,878,142 | 10/1989 | Bergman et al. | 324/522 |
| 5,399,974 | 3/1995 | Eriksson et al. | 324/522 |
| 5,428,549 | 6/1995 | Chen | 364/483 |
| 5,543,995 | 8/1996 | Kumagai et al. | 361/65 |
| 5,608,327 | 3/1997 | Jones et al. | 324/522 |

*Primary Examiner*—Maura K. Regan
*Attorney, Agent, or Firm*—Woodcock Washburn Kurtz Mackiewicz & Norris LLP

[57] ABSTRACT

A process for identifying the type of fault detected by a protective relay includes measuring pre-fault and post-fault samples of current waveforms on the phase-A, phase-B and phase-C conductors of a transmission line. Next, increment currents DELIA1, DELIB1, and DELIC1 are calculated, where $$DELIA1 = (I_{ar} - I_{apr})^2 + (I_{ai} - I_{api})^2$$
$$DELIB1 = (I_{br} - I_{bpr})^2 + (I_{bi} - I_{bpi})^2$$
$$DELIC1 = (I_{cr} - I_{cpr})^2 + (I_{ci} - I_{cpi})^2.$$

The increment currents are then employed to identify a two-phase to ground fault. In calculating the increment currents, $I_{ar}$ represents a post-fault value of the real part of the phase-A current, $I_{apr}$ represents a pre-fault value of the real part of the phase-A current, $I_{ai}$ represents a post-fault value of the imaginary part of the phase-A current, and $I_{api}$ represents a pre-fault value of the real part of the phase-A current. The phase-B and phase-C values are denoted accordingly.

12 Claims, 3 Drawing Sheets

FAULT TYPE CLASSIFICATION ALGORITHM

FIELD OF THE INVENTION

The present invention relates generally to protective relaying, and more particularly to a microprocessor- or DSP-based protective relay with an improved fault type classification function.

BACKGROUND OF THE INVENTION

Electrical transmission lines and power generation equipment must be protected against faults and consequent short circuits, which could cause a collapse of the power system, equipment damage, and personal injury. It is the function of the protective relays, which monitor AC voltages and currents, to locate and classify line faults and initiate isolation by the tripping of circuit breakers. Protective relays generally perform one or more of the following functions: (a) monitoring the system to ascertain whether it is in a normal or abnormal state; (b) metering, which involves measuring certain electrical quantities for operational control; (c) protection, which typically involves tripping a circuit breaker in response to the detection of a short-circuit condition; and (d) alarming, which provides a warning of some impending problem. Fault location and fault typing, for example, are associated with the protection function and involve measuring critical system parameters and, when a fault occurs, quickly making a rough estimate of the fault location and type, and of certain characteristics of the fault so that the power source can be isolated from the faulted line.

Modern protective relays employ microprocessors and/or digital signal processors (DSPs) to process the voltage and current waveforms measured on the protected transmission line (the term "transmission line" as employed herein is intended to cover any type of electrical conductor, including high power conductors, feeders, and transformer windings). As mention, such processing may include the identification of the fault type. Fault type identification, or fault typing, includes determining whether the fault is between phases or between one or more phases and ground, and determining the specific phase or phases involved in the fault. A three-phase transmission line, for example, is subject to single-phase to ground, two-phase, three-phase and two-phase to ground faults. Fault typing is a very important function in modern power system relaying, since it supervises some of the relaying algorithms that rely upon correct fault type information. Since an erroneous fault type indication could cause the protective relay to operate incorrectly, it is very important that a reliable fault typing algorithm be provided.

Prior Fault Typing Algorithms

The prior art includes a number of different methods of processing line current and voltage measurements to determine fault type. A predominantly analog technique, for example, is disclosed in U.S. Pat. No. 4,795,983, Jan. 3, 1989, titled "Method and Apparatus for Identifying a Faulted Phase." The technique disclosed in this patent involves subtracting a pre-fault current phasor and a zero-sequence current phasor for each phase from a post-fault current phasor for that phase, and comparing the magnitudes of the resultant phasors.

In an algorithm disclosed by U.S. Pat. No. 5,428,549, Jun. 27, 1995, "Transmission Line Fault Location System," faults are identified as either a phase fault or a ground fault. Two parameters, $\epsilon_0$ and $\lambda_0$ are derived for fault classification:

$$\epsilon_0 = (1/64)\text{Max}(abs(I_a), abs(I_b), abs(I_c))$$

$$\lambda_0 = abs(I_a + I_b + I_c)/3,$$

and the fault is classified as a phase fault if $\epsilon_0 - \lambda_0$ is positive; otherwise, the fault is classified as a ground fault. Once the fault has been classified generally, the specific fault type is determined by comparing all phase currents with an over-current pickup. A fault typing software module is employed when the measured parameter exceeds a prescribed threshold. Fault typing is performed in accordance with the following tables, wherein the notation "f()" refers to a parameter that is set to "0" ("false") when the argument is less than a corresponding threshold (e.g., when $I_a$<an overcurrent pickup) and "1" ("true") when the argument is greater than or equal to the threshold.

| f($I_a$) | f($I_b$) | f($I_c$) | Fault Type |
|---|---|---|---|
| Ground Faults | | | |
| 1 | 0 | 0 | AG Fault |
| 0 | 1 | 0 | BG Fault |
| 0 | 0 | 1 | CG Fault |
| 1 | 1 | 0 | ABG Fault |
| 0 | 1 | 1 | BCG Fault |
| 1 | 0 | 1 | CAG Fault |
| 1 | 1 | 1 | 3φ Fault |
| Phase Faults | | | |
| 1 | 1 | 0 | AB Fault |
| 0 | 1 | 1 | BC Fault |
| 1 | 0 | 1 | AC Fault |
| 1 | 1 | 1 | 3φ Fault* |

A fault type classification algorithm used in an "MDAR relay" available from ABB Power T&D Co. Inc., the assignee of the present invention, has proved to be successful in classifying most fault types. This algorithm, described in detail below, utilizes the sum of the positive and negative sequence fault currents to identify the fault type. However, it can sometimes fail to identify double line to ground faults if the zero sequence source impedance is much smaller than the positive sequence source impedance. This potential failure is due to the smaller zero sequence source impedance, which bypasses the fault current such that the negative sequence current would be too small to be effective in the fault typing algorithm. This is the case, e.g., where large capacity power transformers with their neutrals grounded are connected to a bus behind the relay. In such a case, the zero sequence source impedance could be substantially smaller than the positive sequence source impedance.

FIG. 2 is a flowchart of the MDAR fault typing algorithm. In the following discussion, the subscripts "a", "b" and "c" refer to the a, b and c phases of a transmission line, respectively. The subscripts "r" and "i" refer to real and imaginary parts, respectively; the subscripts "p" and "f" refer to pre-fault and post-fault, respectively; and the subscripts "1", "2" and "0" refer to positive, negative and zero sequence components, respectively. Thus, e.g., "$I_{ar}$" represents the real part of the phase-a current, and "$I_{a1r}$" represent the real part of the phase-a positive sequence fault current. The other symbols will be clear to those skilled in the protective relaying field.

Referring now to FIG. 1, the prior fault typing algorithm involves the use of a sum of the positive and negative sequence fault current components. The load and zero sequence currents are excluded in the algorithm, which employs so-called increment currents DELIA, DELIB, DELIC:

$$DELIA=(I_{ar}-I_{apr}-I_{0r})^2+(I_{ai}-I_{api}-I_{0i})^2$$

$$DELIB=(I_{br}-I_{bpr}-I_{0r})^2+(I_{bi}-I_{bpi}-I_{0i})^2$$

$$DELIC=(I_{cr}-I_{cpr}-I_{0r})^2+(I_{ci}-I_{cpi}-I_{0i})^2.$$

The increment currents can alternatively be computed as a sum of the positive and negative sequence fault components for each phase:

$$DELIA=(I_{af1r}+I_{af2r})^2+(I_{af1i}+I_{af2i})^2$$

$$DELIA=(I_{bf1r}+I_{bf2r})^2+(I_{bf1i}+I_{bf2i})^2$$

$$DELIC=(I_{cf1r}+I_{cf2r})^2+(I_{cf1i}+I_{cf2i})^2.$$

The post-fault real and imaginary positive and negative sequence currents ($I_{af1r}$, $I_{af1i}$, $I_{af2r}$, $I_{af2i}$, etc.) are employed to the exclusion of the zero sequence components.

As shown in FIG. 1, the fault typing algorithm also employs certain quantities for distinguishing two-phase faults from two-phase to ground faults (e.g., for distinguishing an "AB" from an "ABG" fault). Such quantities, referred to as I3I0_SQ and I30SET, are given by:

$$I3I0\_SQ=(I_{ar}+I_{br}+cr)^2+(I_{ai}+I_{bi}+I_{ci})^2$$

$$I30SET=I_{OL}^2.$$

Those skilled in the art will recognize that I30SET is a setting that is determined by the user. There is a relay unit in the system that is called the low set zero sequence current, or $I_{OL}$. As indicated above, I30SET is set as a function of $I_{OL}$.

It is clear from these alternative equations that, if the negative sequence current is small, the three increment currents (DELIA, DELIB, DELIC) would be very similar, and the algorithm would fail to correctly identify the fault type. This could happen in the case of a double line to ground fault. In this case, the fault type algorithm would not distinguish a double line to ground fault from a three-phase fault. (Further details of the algorithm depicted in FIG. 2 will be clear from the description of the improved algorithm provided by the present invention, which is described below with reference to FIG. 3.)

SUMMARY OF THE INVENTION

A primary goal of the present invention is to improve upon the MDAR fault type classification algorithm so that it can reliably identify double line to ground faults, particularly where the zero sequence source impedance is much smaller than the positive sequence source impedance. A further object of the invention is to provide a protective relay utilizing the improved fault typing algorithm.

A process or system in accordance with the present invention includes the steps of, or means for, measuring pre-fault and post-fault samples of current waveforms on the phase-A, phase-B and phase-C conductors of a transmission line; and then calculating increment currents (DELIA1, DELIB1, DELIC1) as, $$DELIA1=(I_{ar}-I_{apr})^2+(I_{ai}-I_{api})^2$$

$$DELIB1=(I_{br}-I_{bpr})^2+(I_{bi}-I_{bpi})^2$$

$$DELIC1=(I_{cr}-I_{cpr})^2+(I_{ci}-I_{cpi})^2.$$

The increment currents are employed as described below to identify a two-phase to ground fault. In calculating the increment currents, $I_{ar}$ represents a post-fault value of the real part of the phase-A current, $I_{apr}$ represents a pre-fault value of the real part of the phase-A current, $I_{ai}$ represents a post-fault value of the imaginary part of the phase-A current, and $I_{api}$ represents a pre-fault value of the real part of the phase-A current. The phase-B and phase-C values are denoted accordingly.

In a presently preferred embodiment of the invention, a phase-A to phase-B to ground ("ABG") fault is identified if DELIA1 is greater than 2.25×DELIC1 and DELIB1 is greater than 2.25×DELIC1; a phase-B to phase-C to ground fault ("BCG") is identified if DELIB1 is greater than 2.25× DELIA1 and DELIC1 is greater than 2.25×DELIA1; and a phase-C to phase-A to ground fault ("CAG") is identified if DELIC1 is greater than 2.25×DELIB1 and DELIA1 is greater than 2.25×DELIB1.

Other features of the invention are described below.

DETAILED DESCRIPTION OF PREFERRED EMBODIMENTS

Figure 1:
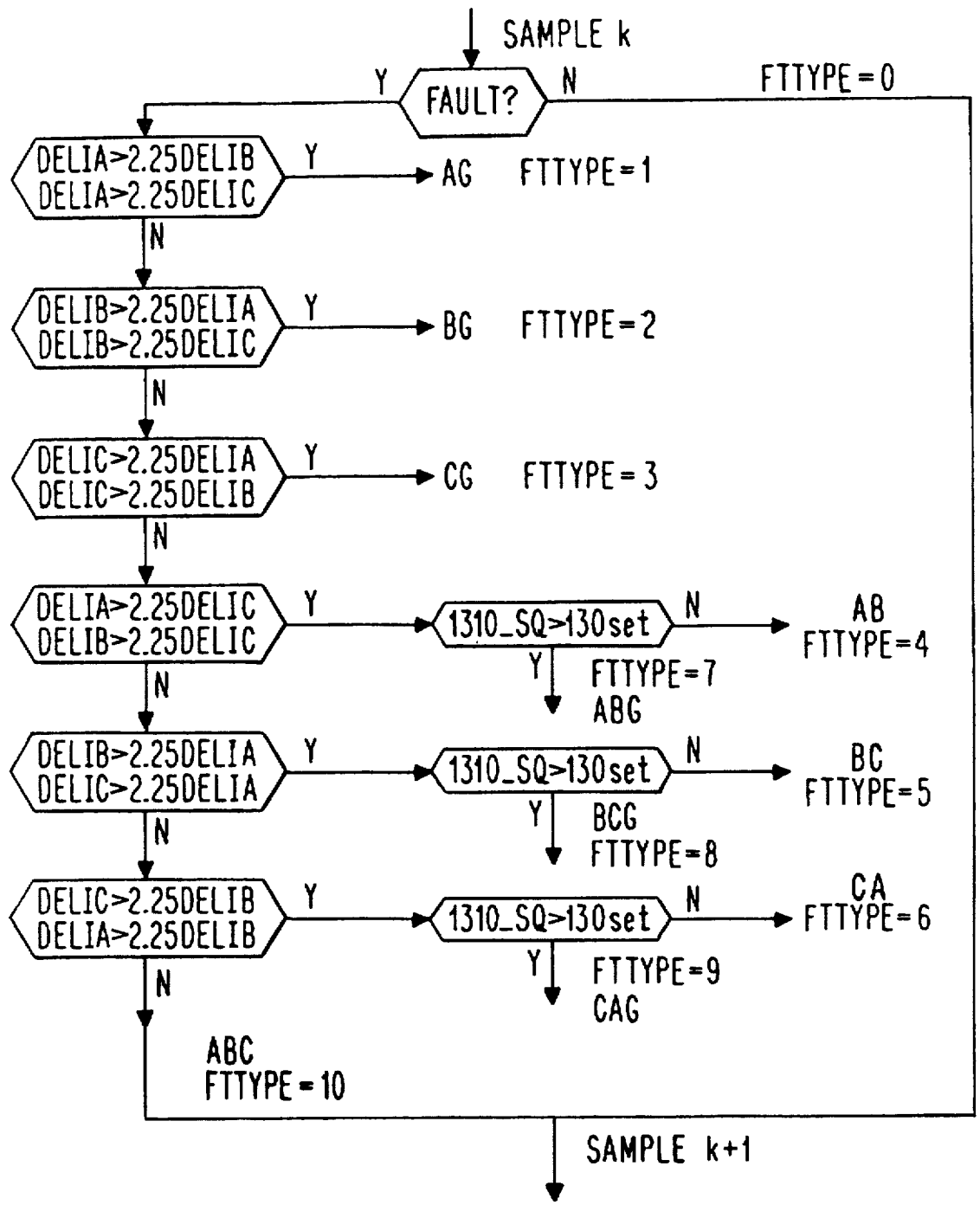
FIG. 1 is a flowchart of a prior art fault typing algorithm.
Figure 2:
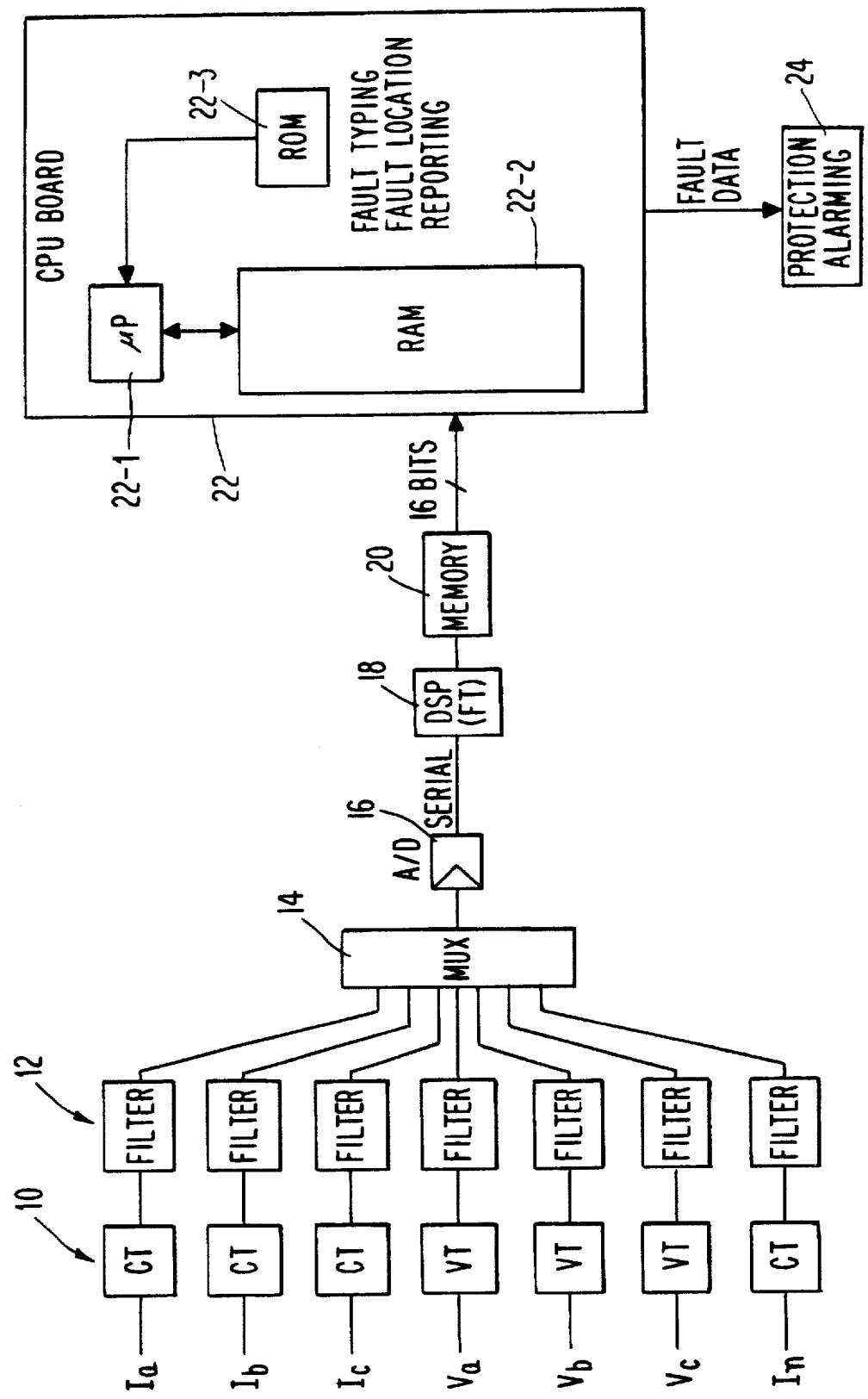
FIG. 2 schematically depicts a protective relay in accordance with the present invention.

FIG. 1 depicts a microprocessor-based protective relay that provides a preferred environment for the present invention. As shown, the relay comprises current and voltage transducers 10, filters 12, and a multiplexor 14, the latter outputting an interleaved stream of analog phase current and voltage signal samples, as well as neutral current samples. The analog multiplex output by the multiplexor 14 is digitized by an analog-to-digital converter 16. The output of the analog-to-digital converter 16 is fed to a DSP 18. The DSP 18 employs a Digital Fourier Transform (DFT) to produce phasor data for each of the sampled channels (an improved DFT is disclosed in co-pending application Ser. No. 08/811, 646, filed on Mar. 5, 1997, titled "Protective Relay with Improved DFT Function" (attorney docket no. ABRE-0518) ). The phasor data is stored in a memory 20. The phasor data in the memory 20 is fed via a data bus to a central processing unit (CPU) board 22. The CPU board 22 includes a microprocessor 22-1, random access memory 22-2, and read only memory (ROM) 22-3. The ROM 22-3 contains program code controlling the microprocessor 22-1 in performing fault typing, fault location, reporting, and other protective relaying functions. The random access memory 22-2 may include a pre-fault segment of memory and a post-fault segment of memory, which may be employed (as described, e.g., in U.S. Pat. No. 5,428,549) in performing the various protective relaying functions. The CPU board 22 may output fault data to a protection/alarming block 24 that performs protection and alarming functions such as tripping a circuit breaker or sounding an alarm as appropriate.

Figure 3:
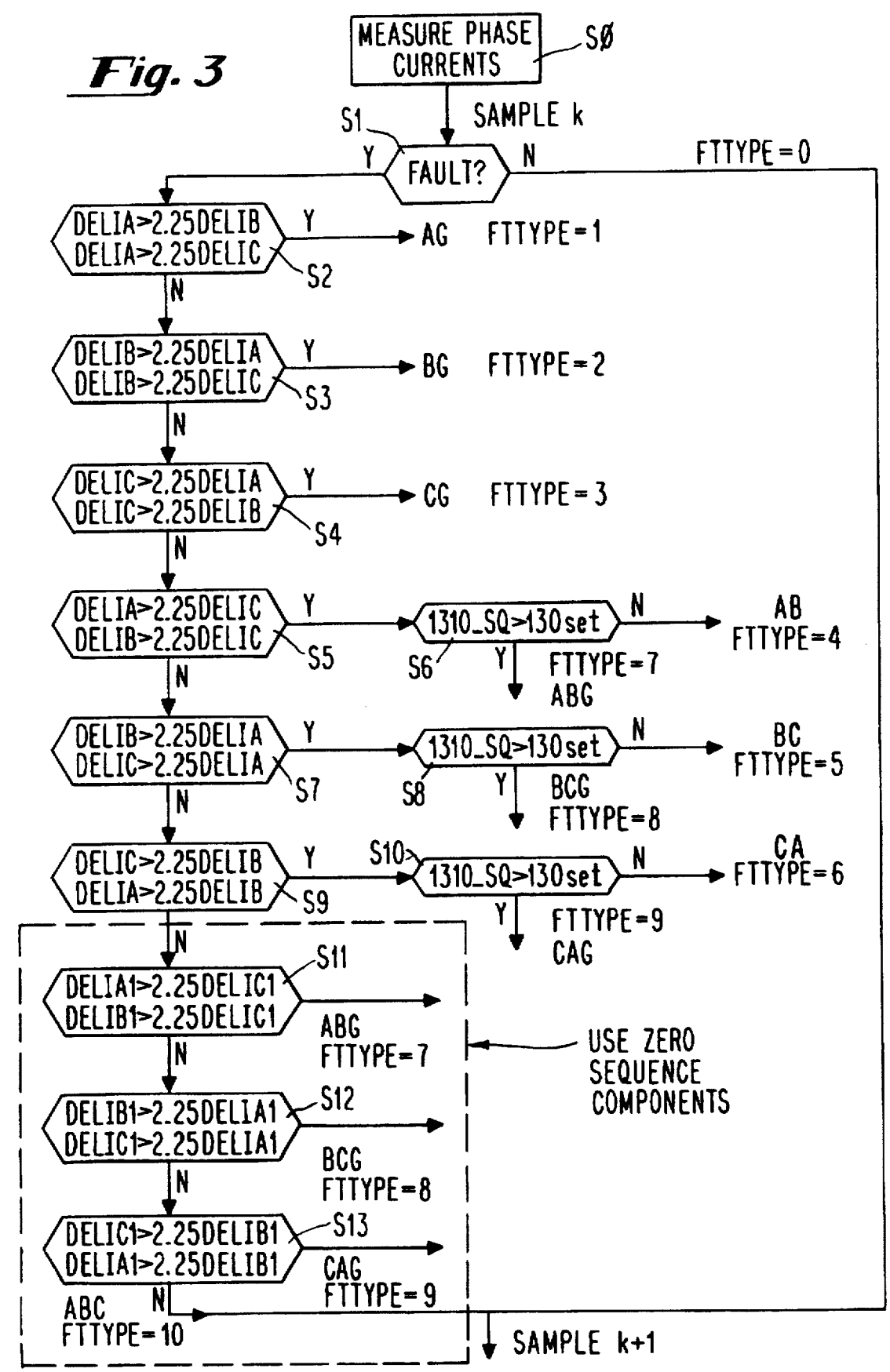
FIG. 3 is a flowchart of an improved fault typing algorithm in accordance with the present invention.

FIG. 3 depicts a presently preferred embodiment of the improved fault typing algorithm. We know from fault analyses that, for a double line to ground fault, the positive sequence current is equal to sum of the negative and zero sequence currents ($I_1=I_2+I_0$). Hence, if the negative sequence current ($I_2$) is small compared to the positive sequence current ($I_1$), the zero sequence current must be close to the positive sequence current ($I_0 \approx I_1$). In this case, if we include the zero sequence in the increment current, double line faults would be correctly identified. This leads to a supplementary criterion: We use two types of increment currents. The first type is the one used in the basic MDAR algorithm discussed above, and the second is as follows. In contrast to the first type of increment currents (DELIA, DELIB, DELIC), the new increment currents (DELIA1, DELIB1, DELIC1) include the zero sequence components:

$$DELIA1 = (I_{ar} - I_{apr})^2 + (I_{ai} - I_{api})^2$$

$$DELIB1 = (I_{br} - I_{bpr})^2 + (I_{bi} - I_{bpi})^2$$

$$DELIC1 = (I_{cr} - I_{cpr})^2 + (I_{ci} - I_{cpi})^2.$$

The fault type classification logic is modified as shown in FIG. 3. Much of the logic is the same as that shown in FIG. 1. The difference lies in the three-phase fault path. In the new logic, the existing increment currents are first used to identify the fault type. If the fault type falls into the three-phase path, the new increment currents are used to recheck whether the fault is a double line fault.

Referring now the FIG. 3, the inventive fault typing algorithm will now be described in detail. The algorithm begins with the measurement of phase currents (step S0), and then determines whether a fault has been detected (step S1). If a fault has not been detected, the fault type is set equal to "0" and subsequent samples are taken. On the other hand, if a fault is detected, the relative values of DELIA, DELIB, and DELIC are compared as shown. Thus, at step S2, a phase-A to ground fault (an "AG" fault, fault type=1) is identified if DELIA is greater than 2.25×DELIB and DELIA is also greater than 2.25×DELIC. At step S3, DELIB is checked to determine whether it is greater than 2.25×DELIA and 2.25×DELIC; if so, a phase-B to ground fault ("BG", fault type=2) is indicated. At step S4, DELIC is checked to determine whether it is greater than both 2.25×DELIA and 2.25×DELIB, and a phase-C to ground fault ("CG", fault type=3) is indicated if it is.

If the comparisons made in steps S2 through S4 all yield negative results, the algorithm determines whether the fault is a two-phase fault. First, at step S5, the algorithm tests whether DELIA is greater than 2.25×DELIC and DELIB is greater than 2.25 DELIC. If these inequalities are simultaneously met, the algorithm determines (step S6) whether the fault is a phase-A to phase-B ("AB", fault type =4) fault or a phase-A to phase-B to ground ("ABG") fault. Similarly, in steps S7, S8, S9 and S10, the algorithm identifies a phase-B to phase-C fault ("BC", fault type=5) and a phase-C to phase-A ("CA", fault type=6) fault (or an "ACG" or "BCG" fault, as shown). If none of these fault types is detected, the algorithm continues to steps S11 through S13, which are indicated by the dashed line in FIG. 3. These steps utilize the zero sequence components, i.e., they use the modified increment currents DELIA1, DELIB1, and DELIC1.

As shown, steps S11 through S13 determine whether the fault is a two-phase to ground fault ("ABG", "BCG", "CAG", fault types=7, 8, or 9, respectively) or a three-phase fault ("ABC", fault type=10). This is done by comparing I3I0_SQ to I3I0SET. (These quantities are explained above in the discussion of the background of the invention.) A phase-A to phase-B to ground ("ABG") fault is identified when DELIA1 is greater than 2.25×DELIC1 and DELIB1 is greater than 2.25×DELIC1. A phase-B to phase-C to ground fault is identified when DELIB1 is greater than 2.25× DELIA1 and DELIC1 is greater than 2.25×DELIA1. Similarly, a phase-C to phase-A to ground fault is identified when DELIC1 is greater than 2.25×DELIB1 and DELIA1 is greater than 2.25×DELIB1. If all of the comparisons performed in steps S11 through S13 yield a negative result, the algorithm identifies the fault type as a three-phase fault (i.e., as a phase-A to phase-B to phase-C, or "ABC" fault).

Those skilled in the art will recognize that the scaling factor used in the comparisons in steps S2 through S13 (i.e., the scaling factor of 2.25) may be modified to suit a particular protective relaying system. To understand how this is done, consider the following explanation of the derivation and purpose of the scaling factor.

The scaling factor is a threshold used to distinguish the various fault types. It is derived from the relationships among the phase currents associated with different types of faults. Based on a simple power system model and a symmetrical components based analysis, the following results are obtained for nine types of fault:

| | DELIA = $|I_{a1} + I_{a2}|$ | DELIB = $|I_{b1} + I_{b2}|$ | DELIC = $|I_{c1} + I_{c2}|$ |
| --- | --- | --- | --- |
| AB  | $2|I_1|$ | $|I_1|$ | $|I_1|$ |
| BG  | $|I_1|$ | $2|I_1|$ | $|I_1|$ |
| CG  | $|I_1|$ | $|I_1|$ | $2|I_1|$ |
| AB  | $\sqrt{3}|I_1|$ | $\sqrt{3}|I_1|$ | 0 |
| BC  | 0 | $\sqrt{3}|I_1|$ | $\sqrt{3}|I_1|$ |
| CA  | $\sqrt{3}|I_1|$ | 0 | $\sqrt{3}|I_1|$ |
| ABG | (1 to $\sqrt{3}$) $|I_1|$ | (1 to $\sqrt{3}$) $|I_1|$ | (1 to 0) $|I_1|$ |
| BCG | (1 to 0) $|I_1|$ | (1 to $\sqrt{3}$) $|I_1|$ | (1 to $\sqrt{3}$) $|I_1|$ |
| CAG | (1 to $\sqrt{3}$) $|I_1|$ | (1 to 0) $|I_1|$ | (1 to $\sqrt{3}$) $|I_1|$ |

In the above table, $|I_1|$ is the magnitude of the positive sequence current and can be referred to any phase (a, b or c) since only the magnitude is considered. It is apparent that for single line to ground faults, such as AG, BG, or CG, the faulted incremental phase current is twice as large in magnitude as that of the healthy phases. In the ideal case, for phase-to-phase faults, the faulted phase currents are equal and the healthy phase current is zero. However, there is no clear relationship among the phases for double-phase to ground faults. The phase current relationships are strongly dependent on the system configuration and fault location. If the total zero sequence impedance at the fault point is much less than the total positive sequence impedance, all of the incremental phase currents will be approximately equal whereas, if the zero sequence impedance is very large, the phase current relationships will be similar to those for phase-to-phase faults. In other circumstances, the faulted phase incremental currents will be greater than that of the healthy phase.

A threshold of 1.5 has traditionally been selected for the fault type classification algorithm. I.e., the faulted phase incremental current(s) is (are) 1.5 times greater than that of the healthy phase(s). This is clearly true for single-phase to ground and phase-to-phase faults, but may or may not be true for double-phase to ground faults. The present invention addresses this problem.

One may ask why a threshold value of 1.5 was selected in the presently preferred embodiment of the invention. Theoretically, any threshold value between 1 and 2 (but not including 1 or 2) would work. The relationships in the above table are based upon an ideal, simple single end system. But in reality the system connections are more complicated than that, and there are measurement errors and unbalanced conditions to contend with, and so on. Therefore, there is a need to accommodate these conditions. If the threshold were close to the lower bound of 1, there would be more coverage for double-phase to ground faults but there could be a difficulty in distinguishing double-phase to ground from single-phase to ground faults. On the other hand, if the threshold were set close to the higher bound of 2, it would degrade the system's sensitivity in distinguishing single-phase to ground faults, which are most common. A tradeoff must be made. Practically, any value between 1.3 to 1.7 would be a reasonable choice.

Moreover, in actual implementations, a square calculation is preferred over a square root, and so the scaling factor of $1.5^2=2.25$ is used instead of 1.5.

The modified fault type classification algorithm has been intensively tested using varieties of EMTP fault cases. It is evident that the new algorithm improves the fault type classification algorithm's ability to identify double line faults. The modified algorithm is capable of correctly identifying double line to ground faults that involve a small negative sequence current.

The scope of protection of the following claims is not intended to be limited to the presently preferred embodiments. Thus, for example, except where they are expressly so limited, the claims are not limited to applications involving three-phase power systems or power systems employing a 60 Hz or 50 Hz fundamental frequency. Moreover, the claims are not limited to systems associated with any particular part (i.e., transformer, feeder, high power transmission line, etc.) of a power distribution system. In addition, the scaling factor could be modified as discussed above. The algorithm could also be used in distance relay and fault location algorithms or to supervise single-pole tripping, automatic circuit breaker reclosing and/or circuit breaker failure protection. In addition, the invention may be employed in connection with transmission lines as well as distribution lines, a transformers, generators or motors. Further, the invention may be implemented in on-line devices such as relay systems or fault location or monitoring systems that run in real time. The invention may also be utilized in off-line programs such as power system fault analysis or location, relay modeling, etc.

I claim:

1. A process for identifying the type of fault detected by a protective relay associated with a three-phase transmission line including phase-A, phase-B and phase-C conductors, the process comprising the steps of:

(a) measuring pre-fault and post-fault samples of current waveforms on the phase-A, phase-B and phase-C conductors, said current waveforms being analyzable into real and imaginary parts;

(b) calculating increment currents (DELIA1, DELIB1, DELIC1) as, $$DELIA1=(I_{ar}-I_{apr})^2+(I_{ai}-I_{api})^2$$

$$DELIB1=(I_{br}-I_{bpr})^2+(I_{bi}-I_{bpi})^2$$

$$DELIC1=(I_{cr}-I_{cpr})^2+(I_{ci}-I_{cpi})^2; \text{ and}$$

(c) employing said increment currents to identify a two-phase to ground fault;

wherein $I_{ar}$ represents a post-fault value of a real part of the phase-A current, $I_{apr}$ represents a pre-fault value of the real part of the phase-A current, $I_{ai}$ represents a post-fault value of an imaginary part of the phase-A current, $I_{api}$ represents a pre-fault value of the real part of the phase-A current, $I_{br}$ represents a post-fault value of a real part of the phase-B current, $I_{bpr}$ represents a pre-fault value of the real part of the phase-B current, $I_{bi}$ represents a post-fault value of an imaginary part of the phase-B current, $I_{bpi}$ represents a pre-fault value of the real part of the phase-B current, $I_{cr}$ represents a post-fault value of a real part of the phase-C current, $I_{cpr}$ represents a pre-fault value of the real part of the phase-C current, $I_{ci}$ represents a post-fault value of an imaginary part of the phase-C current, and $I_{cpi}$ represents a pre-fault value of the real part of the phase-C current.

2. A process as recited in claim 1, wherein a phase-A to phase-B to ground ("ABG") fault is identified if DELIA1 is greater than 2.25×DELIC1 and DELIB1 is greater than 2.25×DELIC1.

3. A process as recited in claim 1, wherein a phase-B to phase-C to ground fault ("BCG") is identified if DELIB1 is greater than 2.25×DELIA1 and DELIC1 is greater than 2.25×DELIA1.

4. A process as recited in claim 1, wherein a phase-C to phase-A to ground fault ("CAG") is identified if DELIC1 is greater than 2.25×DELIB1 and DELIA1 is greater than 2.25×DELIB1.

5. A process as recited in claim 1, wherein a three-phase fault ("ABC") is identified if the fault is determined to be neither a single-phase to ground fault ("AG", "BG", "CG") nor a two-phase fault ("AB", "BC", "CA") and none of the following inequalities is true:

$$DELIA1>2.25\times DELIC1 \text{ and } DELIB1>2.25\times DELIC1;$$

$$DELIB1>2.25\times DELIA1 \text{ and } DELIC1>2.25\times DELIA1;$$

$$DELIC1>2.25\times DELIB1 \text{ and } DELIA1>2.25\times DELIB1.$$

6. A process as recited in claim 1, wherein:

a phase-A to phase-B to ground ("ABG") fault is identified if DELIA1 is greater than 2.25×DELIC1 and DELIB1 is greater than 2.25×DELIC1;

a phase-B to phase-C to ground fault ("BCG") is identified if DELIB1 is greater than 2.25×DELIA1 and DELIC1 is greater than 2.25×DELIA1; and a phase-C to phase-A to ground fault ("CAG") is identified if DELIC1 is greater than 2.25×DELIB1 and DELIA1 is greater than 2.25×DELIB1.

7. A protective relaying system associated with a three-phase transmission line including phase-A, phase-B and phase-C conductors, the system comprising:

(a) means for measuring pre-fault and post-fault samples of current waveforms on the phase-A, phase-B and phase-C conductors, said current waveforms being analyzable into real and imaginary parts;

(b) means for calculating increment currents (DELIA1, DELIB1, DELIC1) as, $$DELIA1=(I_{ar}-I_{apr})^2+(I_{ai}-I_{api})^2$$

$$DELIB1=(I_{br}-I_{bpr})^2+(I_{bi}-I_{bpi})^2$$

$$DELIC1=(I_{cr}-I_{cpr})^2+(I_{ci}-I_{cpi})^2; \text{ and}$$

(c) means for employing said increment currents to identify a two-phase to ground fault;

wherein $I_{ar}$ represents a post-fault value of a real part of the phase-A current, $I_{apr}$ represents a pre-fault value of the real part of the phase-A current, $I_{ai}$ represents a post-fault value of an imaginary part of the phase-A current, $I_{api}$ represents a pre-fault value of the real part of the phase-A current, $I_{br}$ represents a post-fault vblue of a real part of the phase-B current, $I_{bpr}$ represents a pre-fault value of the real part of the phase-B current, $I_{bi}$ represents a post-fault value of an imaginary part of the phase-B current, $I_{bpi}$ represents a pre-fault value of the real part of the phase-B current, $I_{cr}$ represents a post-fault value of a real part of the phase-C current, $I_{cpr}$ represents a pre-fault value of the real part of the phase-C current, $I_{ci}$ represents a post-fault value of an imaginary part of the phase-C current, and $I_{cpi}$ represents a pre-fault value of the real part of the phase-C current.

8. A system as recited in claim 7, wherein a phase-A to phase-B to ground ("ABG") fault is identified if DELIA1 is greater than 2.25×DELIC1 and DELIB1 is greater than 2.25×DELIC1.

9. A system as recited in claim 7, wherein a phase-B to phase-C to ground ("BCG") is identified if DELIB1 is greater than 2.25×DELIA1 and DELIC1 is greater than 2.25×DELIA1.

10. A system as recited in claim 7, wherein a phase-C to phase-A to ground ("CAG") is identified if DELIC1 is greater than 2.25×DELIB1 and DELIA1 is greater than 2.25×DELIB1.

11. A system as recited in claim 7, wherein a three-phase fault ("ABC") is identified if the fault is determined to be neither a single-phase to ground fault ("AG", "BG", "CG") nor a two-phase fault ("AB", "BC", "CA") and none of the following inequalities is true:

*DELIA1>2.25×DELIC1* and *DELIB1>2.25×DELIC1;*

*DELIB1>2.25×DELIA1* and *DELIC1>2.25×DELIA1;*

*DELIC1>2.25×DELIB1* and *DELIA1>2.25×DELIB1.*

12. A system as recited in claim 7, wherein:

a phase-A to phase-B to ground ("ABG") fault is identified if DELIA1 is greater than 2.25×DELIC1 and DELIB1 is greater than 2.25×DELIC1;

a phase-B to phase-C to ground ("BCG") fault is identified if DELIB1 is greater than 2.25×DELIA1 and DELIC1 is greater than 2.25×DELIA1; and a phase-C to phase-A to ground ("CAG") fault is identified if DELIC1 is greater than 2.25×DELIB1 and DELIA1 is greater than 2.25×DELIB1.

\* \* \* \* \*

UNITED STATES PATENT AND TRADEMARK OFFICE
CERTIFICATE OF CORRECTION

PATENT NO. : 5,783,946
DATED : July 21, 1998
INVENTOR(S) : Lifeng Yang

It is certified that error appears in the above-indentified patent and that said Letters Patent is hereby corrected as shown below:

Col.3, line [14 12nd equation] Della should be --Delib--

Signed and Sealed this

Eighth Day of June, 1999

Attest:

Q. TODD DICKINSON

*Attesting Officer*     Acting Commissioner of Patents and Trademarks